(12) United States Patent
Sakaguchi et al.

(10) Patent No.: US 8,773,438 B2
(45) Date of Patent: Jul. 8, 2014

(54) DISPLAY SYSTEM AND DISPLAY METHOD

(75) Inventors: Junichi Sakaguchi, Tokyo (JP);
Toshiharu Nakabayashi, Tokyo (JP);
Noboru Matsui, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 67 days.

(21) Appl. No.: 13/266,353

(22) PCT Filed: Jul. 1, 2010

(86) PCT No.: PCT/JP2010/061275
§ 371 (c)(1),
(2), (4) Date: Jan. 5, 2012

(87) PCT Pub. No.: WO2011/030606
PCT Pub. Date: Mar. 17, 2011

(65) Prior Publication Data
US 2013/0127888 A1 May 23, 2013

(30) Foreign Application Priority Data
Sep. 10, 2009 (JP) .................................. 2009-209294

(51) Int. Cl.
*G06T 11/20* (2006.01)

(52) U.S. Cl.
USPC ........ 345/440; 345/581; 345/619; 345/440.1; 345/441; 715/771; 715/772

(58) Field of Classification Search
CPC . G06F 9/4443; G06F 3/0481; G06F 3/04817; G06F 3/04847; G06F 8/34; G06T 11/60; G06T 11/206; G09G 1/162; G05B 19/0426
See application file for complete search history.

(56) References Cited

U.S. PATENT DOCUMENTS

| | | | |
|---|---|---|---|
| 5,392,208 A | 2/1995 | Takita et al. | |
| 5,408,603 A * | 4/1995 | Van de Lavoir et al. | ...... 715/763 |
| 5,790,424 A | 8/1998 | Sugihara et al. | |
| 6,901,560 B1 * | 5/2005 | Guerlain et al. | .............. 715/833 |

FOREIGN PATENT DOCUMENTS

| | | |
|---|---|---|
| JP | 64-046805 A | 2/1989 |
| JP | 3-100708 A | 4/1991 |
| JP | 6-175626 A | 6/1994 |
| JP | 6-187581 A | 7/1994 |

(Continued)

OTHER PUBLICATIONS

International Search Report of PCT/JP2010/061275, mailing date Oct. 12, 2010.

(Continued)

*Primary Examiner* — Antonio A Caschera
(74) *Attorney, Agent, or Firm* — Westerman, Hattori, Daniels & Adrian, LLP

(57) ABSTRACT

An object is to clearly present not only the state of a controlled object but also a control process performed in a control device that controls the controlled object. Display system including a display control device that presents a calculation process performed in a control device for controlling a controlled object, that displays, on a display device, a control block diagram including a control component and a signal line and the state of the controlled object, and that changes the display format of the signal line in the displayed control block diagram according to a signal value transferred via the signal line.

9 Claims, 9 Drawing Sheets

(56) References Cited

FOREIGN PATENT DOCUMENTS

| | | |
|---|---|---|
| JP | 07-505492 A | 6/1995 |
| JP | 8-036682 A | 2/1996 |
| JP | 08-185220 A | 7/1996 |
| JP | 9-022312 A | 1/1997 |
| JP | 9-157660 A | 6/1997 |
| JP | 9-292902 A | 11/1997 |
| JP | 10-187231 A | 7/1998 |
| JP | 2000-163259 A | 6/2000 |
| JP | 2001-175319 A | 6/2001 |
| JP | 2007-536648 A | 12/2007 |

OTHER PUBLICATIONS

Decision of Patent Grant dated Jul. 23, 2013, issued in corresponding Japanese Patent Application No. 2009-209294, w/English translation.

* cited by examiner

FIG. 7

| VARIABLE NAME | THRESHOLD 1 | THRESHOLD 2 | THRESHOLD 3 | THRESHOLD 4 | THRESHOLD 5 | THRESHOLD 6 | THRESHOLD 7 | THRESHOLD 8 | THRESHOLD 9 | THRESHOLD 10 | THRESHOLD 11 | THRESHOLD 12 |
|---|---|---|---|---|---|---|---|---|---|---|---|---|
| GDA001 | | | | | | | 1 | 20 | 40 | 60 | 80 | 100 |
| GDA002 | | | | | | | 1 | 20 | 40 | 60 | 80 | 100 |
| GDA003 | | | | | | | 1 | 20 | 40 | 60 | 80 | 100 |
| GDA004 | | | | | | | 286 | 288 | 291 | 294 | 296 | 299 |
| GDA005 | | | | | | | 286 | 288 | 291 | 294 | 296 | 299 |
| GDA006 | | | | | | | 286 | 288 | 291 | 294 | 296 | 299 |
| GDA007 | | | | | | | 1 | 20 | 40 | 60 | 80 | 100 |
| GDA008 | | | | | | | 1 | 20 | 40 | 60 | 80 | 100 |
| GDA009 | | | | | | | 1 | 20 | 40 | 60 | 80 | 100 |
| GDA010 | | | | | | | 1 | 20 | 40 | 60 | 80 | 100 |
| GDA011 | | | | | | | 286 | 288 | 291 | 294 | 296 | 299 |
| GDA012 | | | | | | | 286 | 288 | 291 | 294 | 296 | 299 |
| GDA013 | | | | | | | 1 | 20 | 40 | 60 | 80 | 100 |
| GDA014 | | | | | | | 1 | 20 | 40 | 60 | 80 | 100 |
| GDA015 | | | | | | | 1 | 20 | 40 | 60 | 80 | 100 |
| GDA016 | | | | | | | 1 | 20 | 40 | 60 | 80 | 100 |
| GDA017 | −100 | −80 | −60 | −40 | −20 | −1 | 1 | 20 | 40 | 60 | 80 | 100 |
| GDA018 | −4.75 | −4 | −3.25 | −2.15 | −1.75 | −0.2 | 0.2 | 1.75 | 2.15 | 3.25 | 4 | 4.75 |
| GDA019 | −3 | −2.4 | −1.8 | −0.9 | −0.6 | −0.2 | 0.2 | 0.6 | 0.9 | 1.8 | 2.4 | 3 |
| GDA020 | −3 | −2.4 | −1.8 | −0.9 | −0.6 | −0.2 | 0.2 | 0.6 | 0.9 | 1.8 | 2.4 | 3 |
| GDA021 | −3 | −2.4 | −1.8 | −0.9 | −0.6 | −0.2 | 0.2 | 0.6 | 0.9 | 1.8 | 2.4 | 3 |
| GDA022 | −3 | −2.4 | −1.8 | −0.9 | −0.6 | −0.2 | 0.2 | 0.6 | 0.9 | 1.8 | 2.4 | 3 |
| GDA023 | | | | | | | 8 | 20.8 | 33.6 | 46.4 | 59.2 | 72 |

FIG. 8

| COMPARISON RESULT | X<1 | 1≦X<2 | 2≦X<3 | 3≦X<4 | 4≦X<5 | 5≦X<6 |
|---|---|---|---|---|---|---|
| DISPLAY IDENTIFICATION NUMBER | L1 | L2 | L3 | L4 | L5 | L6 |

| COMPARISON RESULT | 6≦X<7 | 7≦X<8 | 8≦X<9 | 9≦X<10 | 10≦X<11 | 11≦X<12 | 12≦X |
|---|---|---|---|---|---|---|---|
| DISPLAY IDENTIFICATION NUMBER | L7 | L8 | L9 | L10 | L11 | L12 | L13 |

DISPLAY SYSTEM AND DISPLAY METHOD

TECHNICAL FIELD

The present invention relates to a display system and a display method.

BACKGROUND ART

In nuclear power plants, thermal power plants, etc., for example, in order to visualize the operational state of the plant and clearly present it to an observer, a monitoring system that displays, on a display screen, a plant system diagram to which information about the operational state is added has been proposed.

For example, a system that graphically displays the presence or absence of a medium in pipes of the plant, a medium type, a medium mixture ratio, and a medium flow direction has been disclosed in Patent Literature 1.

CITATION LIST

Patent Literature

{PTL 1} Japanese Unexamined Patent Application, Publication No. Hei 06-187581

SUMMARY OF INVENTION

Technical Problem

An observer of the plant is required to take appropriate and prompt action when an abnormality is detected in the plant. In order to do that, the observer needs to properly understand the configurations and behaviors of individual components in the plant.

For example, in a nuclear power plant, nuclear fission is controlled by controlling the insertion and withdrawal of control rods. The observer needs to understand not only whether control rods are under insertion control or withdrawal control but also the background that caused such a control state, specifically, what types of control calculation were performed based on what physical quantities, and, as a result, whether insertion control or withdrawal control was eventually performed.

In the above-described conventional monitoring system, the states of the individual components in the plant are visually presented, but this is not enough for the observer to understand the background that caused those states.

Therefore, there is a demand for a training tool for helping the observer properly understand the behavior in the plant and a system for clearly notifying the observer of also background information on a monitor screen of the actual plant.

The present invention has been made in view of such circumstances, and an object thereof is to provide a display system and a display method capable of clearly presenting not only the state of a controlled object but also the control process performed in a control device that controls the controlled object.

Solution to Problem

In order to solve the above-described problems, the present invention employs the following solutions.

According to a first aspect, the present invention provides a display system including: a display section; and a display control section that presents a calculation process performed in a control device for controlling a controlled object, that displays, on the display section, a control block diagram including a control component and a signal line and a state of the controlled object, and that changes a display format of the signal line in the displayed control block diagram according to a signal value transferred via the signal line.

According to the present invention, not only the state of the controlled object but also the control logic diagram for the controlled object are displayed on the display section, and, furthermore, the display format of the signal line in the control logic diagram is changed according to the signal value; therefore, it is possible to clearly present the state of the controlled object and, in addition, the control process performed in the control device, which controls the controlled object.

In the above-described display system, the display control section may change the thickness or color of the signal line according to the signal value transferred via the signal line in the control block diagram.

As described above, since the thickness or color of the signal line in the control block diagram is changed stepwise according to the signal value, the relative signal-value magnitude relation can be clearly presented.

In the above-described display system, the display control section may set one or more thresholds by dividing a range within which the signal value transferred via the signal line in the control block can fall and determine the display format of the signal line from the relationship between the thresholds and the signal value.

As described above, the range within which the signal value can fall is divided to set a plurality of thresholds, thereby making it possible to change the thickness or color in multiple steps and to clearly present the relative signal-value magnitude relation. The range may be divided equally. If there are thresholds used to make a determination for control, these thresholds may be used as they are.

In the above-described display system, when an input signal value input to the control component and an output signal value output from the control component are substantially the same, as in phase compensation, the display control section may display the signal line of the input signal value and the signal line of the output signal value with the same display format.

As described above, when the input signal value and the output signal value of the control component are substantially the same, the display formats therefor are made to match: for example, the thickness of the signal line of the input signal value and the thickness of the signal line of the output signal value are made to match. Therefore, a user who checks this display can properly understand the meaning of control performed by the control component without being confused by a superficial change in value.

In the above-described display system, when an input signal value input to the control component and an output signal value output from the control component indicate the same property while the control level remains substantially unchanged, as in proportional control, integral control, derivative control, or a combination involving these, the display control section may display the signal line of the input signal value and the signal line of the output signal value with the same display format.

As described above, when the input signal value and the output signal value of the control component indicate the same property while the control level remains substantially unchanged, the display formats therefor are made to match: for example, the thickness of the signal line of the input signal value and the thickness of the signal line of the output signal value are made to match. Therefore, a user who checks this display can perceive that the input signal value and the output signal value maintain the same property, and the user can properly understand the meaning of control performed by the control component, without being confused by a superficial change in value.

In the above-described display system, when the control component obtains one output signal value from two or more input signal values, the display control section may use a common threshold to determine the display format for each of the input signal values.

As described above, when the control component obtains one output signal value from two or more input signal values, the common threshold is used to determine the display formats for the input signal values; therefore, a user who checks this display can easily perceive the mutual balance between a plurality of input signal values to be input to the control component.

In the above-described display system, when a lower limit and/or an upper limit used to determine an abnormality or a warning is set for the signal value, the display control section may change the display format of the signal line based on the lower limit and/or the upper limit.

When the upper and lower limits used to determine an abnormality or warning are set for the signal value, the display format is changed based on them; therefore, the abnormality or warning can be clearly presented to a user.

In the above-described display system, when an integrated control component that obtains one output signal value from three or more input signal values is included in the control block diagram, the control block diagram may be displayed on the display section such that the integrated control component is divided into a plurality of divided control components each of which obtains one output signal value from two input signal values.

As described above, when an integrated control component that obtains one output signal value from three or more input signal values is included, the component is divided and displayed as a plurality of control components; therefore, it is possible for a user to easily understand even a complicated control component by simplifying functions of the control component.

In the above-described display system, the controlled object may be an apparatus that constitutes part of a plant, such as a nuclear power plant or a thermal power plant; and the display control section may have a display criterion list used to determine the display format of the signal line, for each operational state of the plant, and change the display format of the signal line by using the display criterion list according to the operational state of the plant.

Thus, the display format can be changed according to the operational state of the plant. Therefore, when an important part differs depending on the operational state of the plant, display can be performed by taking account of the operational states. For example, the important parts are displayed in an emphasized manner.

According to a second aspect, the present invention provides a plant-operation monitoring system including one of the above-described display systems.

According to a third aspect, the present invention provides a display method including the steps of: presenting a calculation process performed in a control device for controlling a controlled object; displaying, on a display section, a control block diagram including a control component and a signal line and a state of the controlled object; and changing a display format of the signal line in the displayed control block diagram according to a signal value transferred via the signal line.

Advantageous Effects of Invention

According to the present invention, an advantage is afforded in that it is possible to clearly present not only the state of the controlled object but also the control process performed in the control device for controlling the controlled object.

BRIEF DESCRIPTION OF DRAWINGS

FIG. 7 is a diagram showing an example display criterion list.

FIG. 8 is a diagram showing an example display identification number list.

DESCRIPTION OF EMBODIMENTS

A display system and a display method according to one embodiment of the present invention will be described below with reference to the drawings. In this embodiment, a description will be given of a case where control rods used in a nuclear power plant are the controlled objects, for the sake of convenience.

Figure 1:
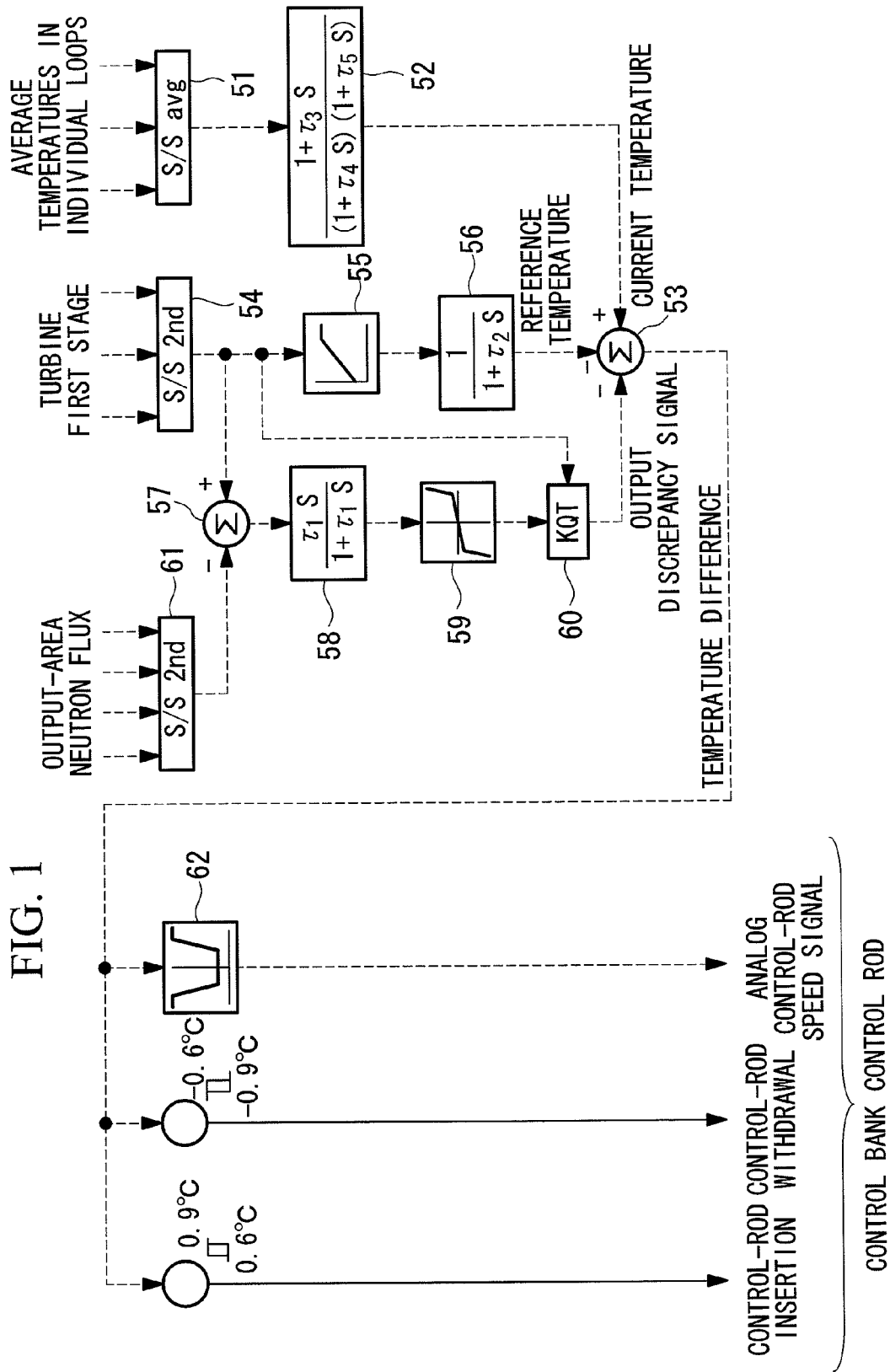
FIG. 1 is a control logic diagram of a control device for control rods according to one embodiment of the present invention.

First, before the display system of this embodiment is described in detail, a description will be given of the control logic of a control device that controls the control rods. FIG. 1 is a control logic diagram of the control device for the control rods, according to this embodiment. In the control logic diagram shown in FIG. 1, three primary-coolant average temperatures detected in individual loops are input to an average-value calculation circuit 51 as input signals. The average-value calculation circuit 51 calculates the average of the three average temperatures and outputs the calculation result to a leading/lagging compensation circuit 52. The leading/lagging compensation circuit 52 applies leading/lagging compensation to the temperature received from the average-value calculation circuit 51 and outputs the temperature obtained after the processing to a second subtractor 53 as the current temperature.

Three signal values (for example, values indicating pressures expressed as percentages) that are normalized after three pressure values detected in a first-stage blade of a turbine are subjected to predetermined signal processing are input to a first signal-selection circuit 54. The first signal-selection circuit 54 selects the second largest value from the three signal values and outputs the selected signal value to a signal conversion circuit 55, a first subtractor 57, and a variable gain circuit 60. The signal conversion circuit 55 has information (for example, a signal conversion function, a signal conversion table, etc.) used to convert the input signal value to temperature, obtains the temperature from the input value by using this information, and outputs the obtained temperature to a primary delay circuit 56. The primary delay circuit 56 applies primary delay processing to the input temperature and outputs the value obtained after the processing to the second subtractor 53 as a reference temperature.

Furthermore, four signal values detected from output-area neutron flux are input to a second signal-selection circuit 61. These input values are numerical values indicating the output of the power plant and are signal values having the same property as the above-described signal values input to the first signal-selection circuit 54. The second signal-selection circuit 61 selects the second largest value from the four input signal values and outputs the selected signal value to the first subtractor 57. The first subtractor 57 calculates the difference between the signal value received from the first signal-selection circuit 54 and the signal value received from the second signal-selection circuit 61 and outputs the calculation result to an incomplete differentiation circuit 58. The incomplete differentiation circuit 58 applies incomplete differentiation calculation processing to the input signal and outputs the value obtained after the processing to a nonlinear gain circuit 59.

The nonlinear gain circuit 59 is a circuit that increases a gain to improve controllability when the difference between the pressure of the output-area neutron flux and the pressure in the turbine first stage is large. The nonlinear gain circuit 59 multiplies the signal value received from the incomplete differentiation circuit 58 by a gain corresponding to this signal value and outputs the calculation result. For example, the nonlinear gain circuit 59 has a table or a function in which the signal value and the gain are associated, uses this table or function to determine the gain corresponding to the input signal value, and then outputs the value obtained by multiplying the input signal value by the determined gain to the variable gain circuit 60.

The variable gain circuit 60 is a circuit that increases a gain to improve controllability when the output of the plant, in other words, the pressure of the turbine first stage, is low. The variable gain circuit 60 multiplies the signal value received from the nonlinear gain circuit 59 by a gain corresponding to the signal value received from the first signal-selection circuit 54 and outputs the signal value obtained after the gain adjustment to the second subtractor 53 as an output discrepancy signal.

Figure 2:
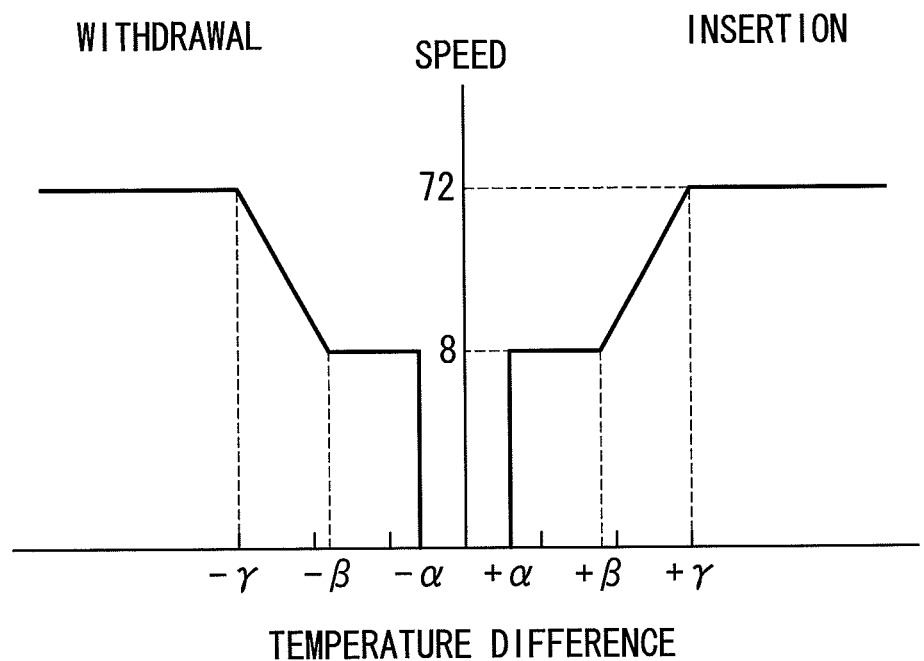
FIG. 2 is a diagram showing an example speed function used in a control-rod speed-determining circuit shown in FIG. 1.

As described above, the current temperature from the leading/lagging compensation circuit 52, the reference temperature from the primary delay circuit 56, and the output discrepancy signal from the variable gain circuit 60 are input to the second subtractor 53. The second subtractor 53 subtracts the reference temperature and the output discrepancy temperature from the current temperature and outputs the calculation result to a control-rod speed-determining circuit 62. The control-rod speed-determining circuit 62 determines the control of the control rods based on a temperature difference Ta received from the second subtractor 53. Specifically, the control-rod speed-determining circuit 62 has a speed function in which the temperature difference Ta is associated with a control-rod withdrawal control speed and a control-rod insertion control speed and determines the control-rod insertion speed or the control-rod withdrawal speed based on the speed function. FIG. 2 is a diagram showing the speed function. As shown in FIG. 2, if the temperature difference Ta falls within a predetermined range, for example, if $-\alpha \leq Ta \leq +\alpha$ holds, it is judged that a temperature balance is obtained with the current control-rod control, and the current control-rod control is maintained.

Furthermore, if the temperature difference Ta is less than $-\alpha$, control is performed to withdraw the control rods in order to raise the current temperature. Furthermore, at this time, the control-rod withdrawal control speed is set such that the withdraw control speed is increased stepwise as the temperature difference Ta becomes smaller. Furthermore, if the temperature difference Ta is greater than $+\alpha$, control is performed to insert the control rods in order to drop the current temperature. Furthermore, at this time, the control-rod insertion control speed is set such that the insertion control speed is increased stepwise as the temperature difference Ta becomes larger.

In this way, in the control-rod control logic, control of the control rods is determined based on the balance between the current temperature, the reference temperature, etc.

Figure 3:
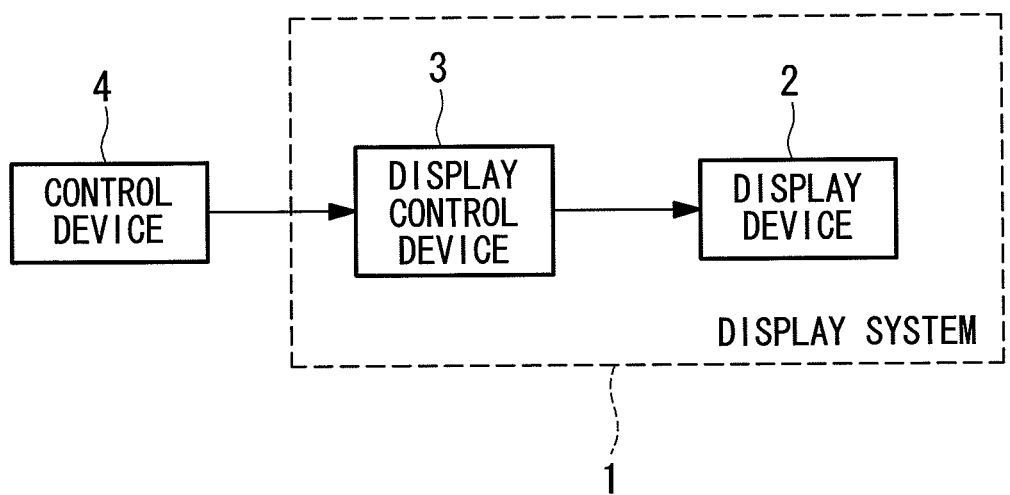
FIG. 3 is a block diagram showing, in outline, the configuration of a display system according to the embodiment of the present invention.

Next, the display system of this embodiment will be described. The display system of this embodiment is a system that clearly visualizes and presents the above-described control-rod control logic to an observer. Specifically, in the control logic diagram shown in FIG. 1, the display format of each signal line is changed according to a signal value transferred via that signal line. More specifically, the thickness of each signal line is changed according to a signal value transferred via that signal line. In order to realize this display format, a display system 1 of this embodiment includes a display device 2 and a display control device 3, as shown in FIG. 3.

Figure 4:
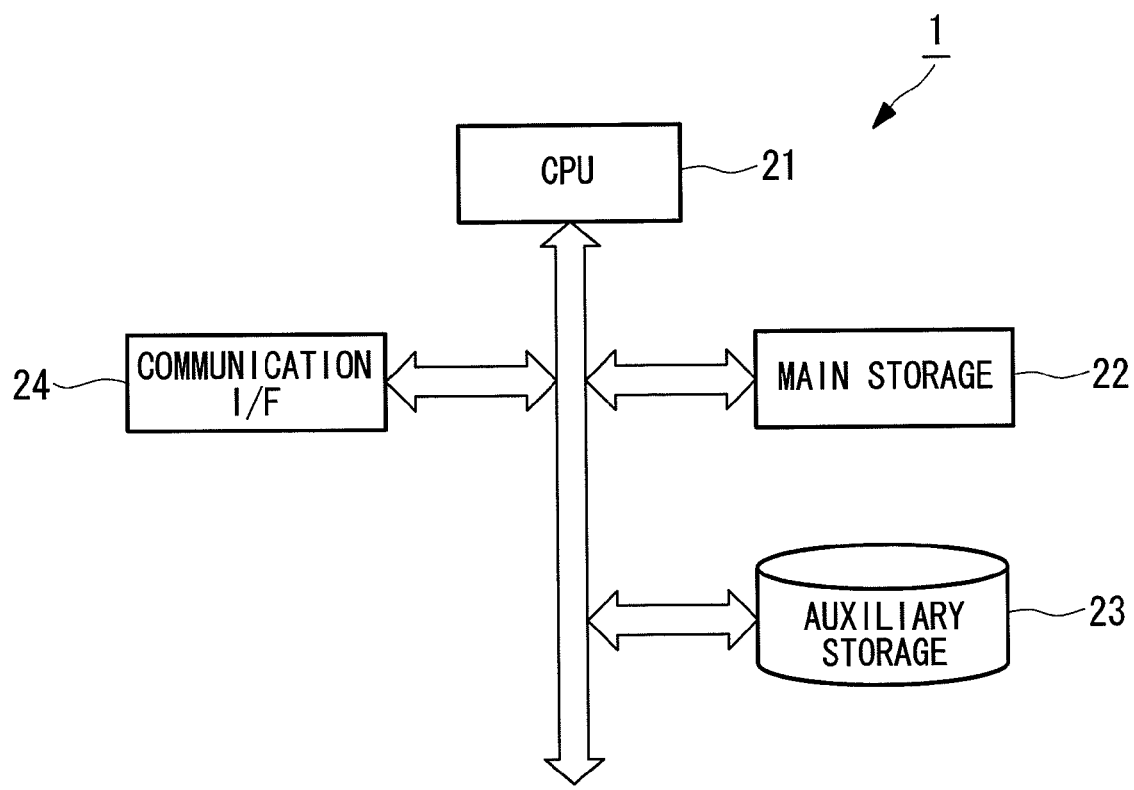
FIG. 4 is a diagram showing a hardware configuration of a display control device shown in FIG. 3.

As shown in FIG. 4, the display control device 3 includes a CPU 21, a main storage 22, such as a RAM, an auxiliary storage 23, and a communication interface (communication I/F) used to transmit and receive information to and from an external device etc. The auxiliary storage 23 is a computer-readable recording medium, for example, a magnetic disc, a magneto-optical disc, a CD-ROM, a DVD-ROM, or a semiconductor memory. The CPU 21 reads various programs stored in the auxiliary storage 23 into the main storage 22 and executes the programs, thereby realizing various kinds of processing.

The display device 2 is, for example, a general display device, such as a liquid crystal display.

Figure 5:
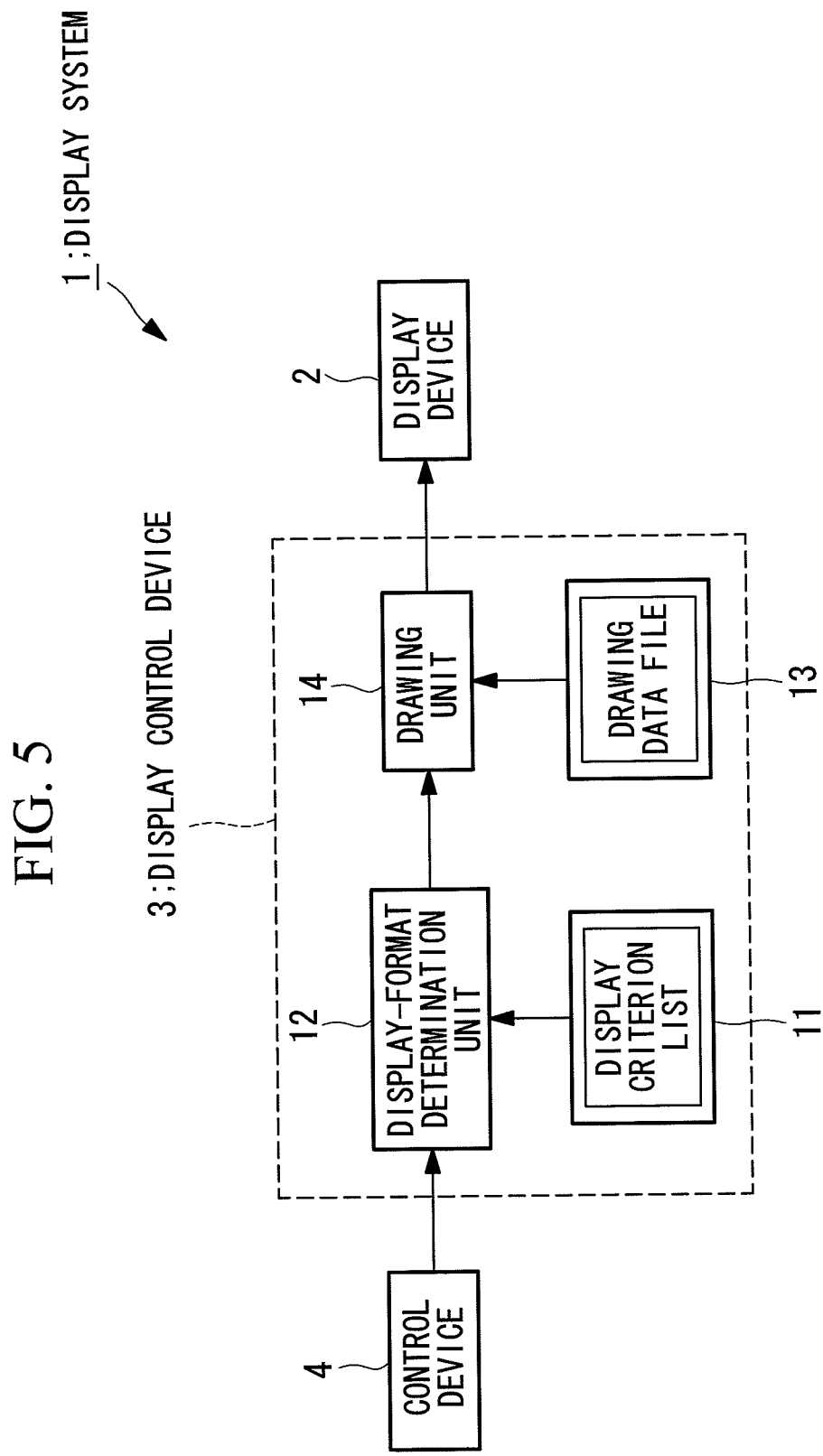
FIG. 5 is a functional block diagram showing, in expanded fashion, the functions of the display control device shown in FIG. 3.

FIG. 5 is a functional block diagram showing, in expanded fashion, the functions of the display control device 3. As shown in FIG. 5, the display control device 3 includes, as main components, a first storage unit 11 in which a display criterion list is stored, a display-format determination unit 12 that refers to the display criterion list stored in the first storage unit 11 to determine the display formats of signal lines via which signal values are transferred, a second storage unit 13 in which a drawing data file is stored, and a drawing unit 14 that refers to the drawing data file stored in the second storage unit 13 based on information received from the display-format determination unit 12 and generates display screen data to be displayed on the display device 2.

Figure 6:
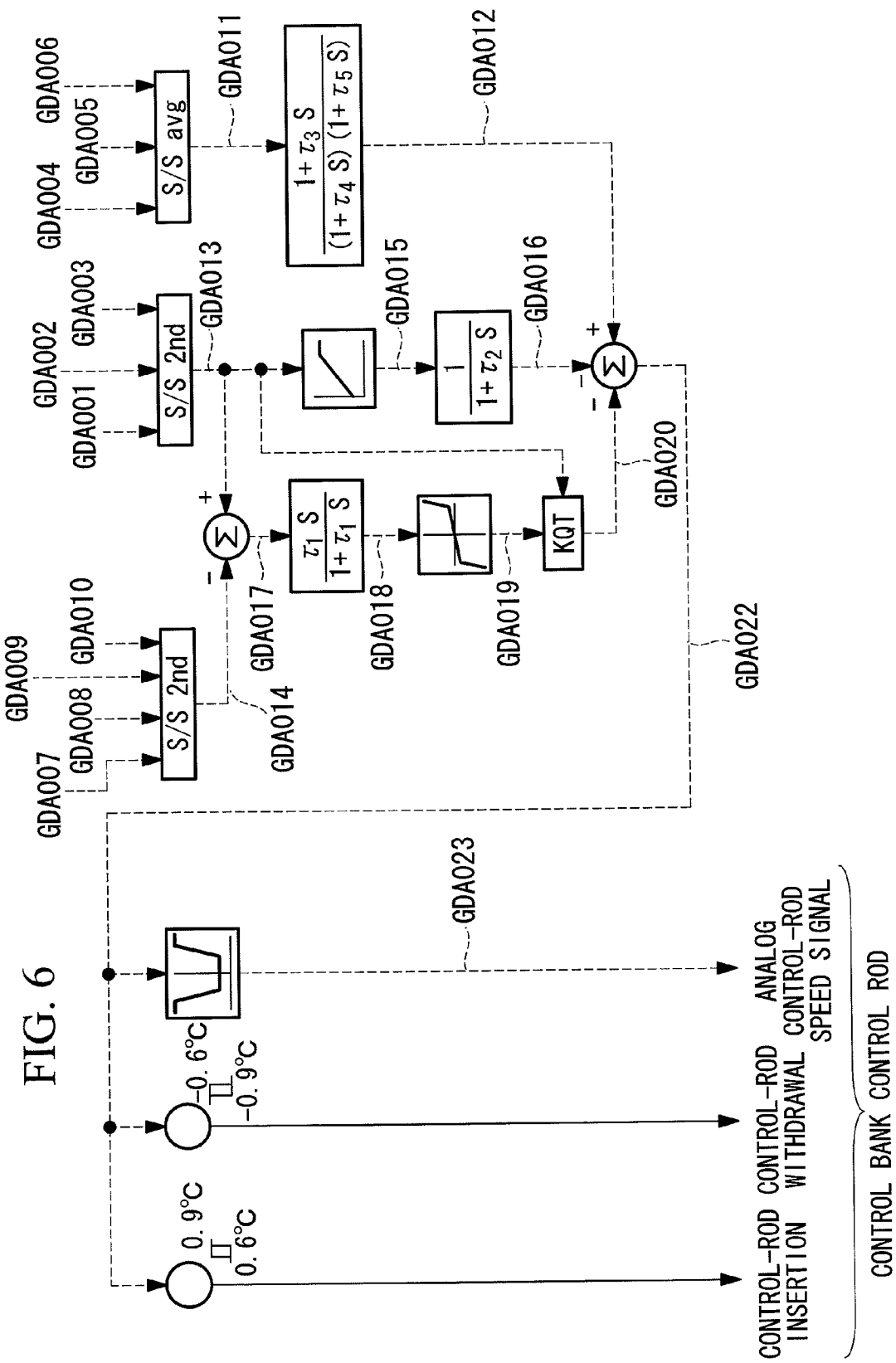
FIG. 6 is a diagram showing variable names assigned to signal values in the control logic diagram.

Signal values calculated by a control device 4 are input to the display control device 3. For example, in the control logic shown in FIG. 1, a variable name serving as unique identification information is assigned to a signal value transferred via each signal line, as shown in FIG. 6. The control device 4 performs calculation processing based on the control logic shown in FIG. 1 to control the control rods in the actual plant based on the calculation result and also outputs to the display control device 3 the signal values obtained through the calculation process of the control logic, in association with their variable names.

The display criterion list, which is used to determine the display formats of the respective signal lines via which signal values are transferred, is stored in the first storage unit 11. FIG. 7 shows an example display criterion list. As shown in FIG. 7, in the display criterion list, at least one threshold is set for each variable name. A setting rule for thresholds will be described later.

The display-format determination unit 12 refers to the display criterion list stored in the first storage unit 11 to determine the display formats of the signal lines via which signal values received from the control device 4 are transferred. Specifically, when information in which the variable names and the signal values are associated is received from the control device 4, the display-format determination unit 12 reads thresholds associated with each of the variable names from the display criterion list stored in the first storage unit 11, compares the read thresholds with the corresponding signal value obtained from the control device 4, and identifies a display identification number corresponding to the comparison result, from a display identification number list shown in FIG. 8. In comparison results shown in FIG. 8, X indicates the signal value, and the numbers indicate the thresholds shown in FIG. 7.

When the display identification number is identified, as described above, the display-format determination unit 12 associates the identified display identification number with the variable name and the signal value and outputs them to the drawing unit 14.

The drawing data file in which each display identification number and drawing data are associated is stored in the second storage unit 13. In the drawing data file, a plurality of signal lines having different thicknesses or colors, for example, are registered in association with display identification numbers. A thicker signal line is registered for a larger display identification number.

The drawing unit 14 obtains from the drawing data file stored in the second storage unit 13 the drawing data corresponding to the display identification number received from the display-format determination unit 12 and reflects the obtained drawing data in the corresponding signal line in the control logic diagram displayed on the display device 2. Thus, the display format of each signal line in the control logic diagram displayed on the display device 2 is changed according to the signal value transferred via the signal line.

Next, a description will be given of the setting rule for the thresholds set in the display criterion list shown in FIG. 7.

(a) Common thresholds are used for signal values having the same property.

For example, in FIG. 6, the signal values indicated by the variable names GDA001 to GDA003 are all expressed as percentages, which are obtained after the pressure values detected in the turbine first stage are subjected to predetermined calculation processing, and have the same property. In this way, for the signal values having the same property, the same threshold group is used to determine the thicknesses of the signal lines. Thus, the same threshold group is used for the signal values having the same property, thereby making it possible to clearly display the magnitude relation of the respective signal values.

Note that the following methods can be employed to set a threshold group.

(a-1) For example, a range within which the signal values can fall may be equally divided by a predetermined division number to set thresholds. For example, for the variable names GDA001 to GDA003, the range within which these signal values can fall is divided by seven to set six thresholds, i.e. 1, 20, 40, 60, 80, and 100.

(a-2) In the range within which the signal values can fall, when a value has a special meaning, for example, when a predetermined threshold is used for determination, that threshold may be used to change the thickness of a signal line. In this case, respective thresholds are not necessarily set equally.

(a-3) If a lower limit and an upper limit for judging abnormalities or warnings are set for a signal value, the minimum thickness may be set for signal values equal to or lower than the lower limit, and the maximum thickness may be set for signal values equal to or higher than the upper limit, for example.

Examples of the other variable names to which the condition (a) is applied include GDA004 to 006 and 007 to 010.

(b) If an input signal value input to a control component and an output signal value output from the control component are substantially the same, common thresholds are used for the input signal value and the output signal value.

For example, since just phase compensation is applied, an input signal value (GDA011) input to the leading/lagging compensation circuit and an output signal value (GDA012) output from the leading/lagging compensation circuit are substantially the same. Therefore, in this case, a common threshold group used for the input signal value is also used for the output signal value. Examples of a control component having this input-output relationship include an averaging circuit, a primary delay circuit, and a signal-selection circuit. Specific examples shown in FIG. 6 include a combination of the variable names GDA004 to 006 and GDA011, a combination of the variable names GDA015 and GDA016, and a combination of the variable names GDA007 to 010 and GDA014.

(c) If an input signal value input to a control component and an output signal value output from the control component have the same property while the control level remains substantially unchanged, thresholds that maintain the relationship between the input signal value and the output signal value are used.

For example, in the control components for performing proportional control, integral control, derivative control, or control involving a combination of these, the input signal value and the output signal value maintain the same property while the control level remains substantially unchanged. In these control components, thresholds that maintain the relationship between the input signal value and the output signal value are used.

Specifically, if the control component is a proportional control circuit that multiplies an input signal value by a gain K and outputs the result, the values in the threshold group that has been used for the input signal value are each multiplied by K and used as a threshold group for an output signal value. Thus, it is possible to display the input signal line and the output signal line of the control component with the same thickness and to clearly present the input-output relationship.

(d) If a control component obtains one output signal value from two or more input signal values, common thresholds are set for the input signal values.

For example, two input signal values (GDA013 and 014) are input to the first subtractor 57. The first subtractor 57 performs subtraction between the values and outputs the result as an output signal value (GDA017). Here, the two input signal values input to the first subtractor 57 are signals indicated by the same dimension (the values of pressures subjected to the same calculation processing and expressed as parameters). Therefore, it is possible to clearly present to an observer the relative magnitude relation of the two input signal values by displaying the input signal values by using the same thresholds.

Next, the operation of the above-described display system 1 will be described.

First, control of control rods in the plant is performed in the control device 4, and signal values calculated during the control process are associated with their variable names and input to the display-format determination unit 12 of the display control device 3. The display-format determination unit 12 reads the display criterion list (see FIG. 7) from the first storage unit 11, sequentially compares, for each of the variable names, the signal value with the respective thresholds in the display criterion list, and obtains from the display identification number list (see FIG. 8) the display identification number corresponding to the comparison result.

For example, if the signal value of the variable name GDA006 is 293, the display-format determination unit 12 compares the signal value of 293 with each of the thresholds that are display criteria for GDA006, i.e., 286, 288, 291, 294, 296, and 299, determines that the signal value of 293 falls between Threshold 9 and Threshold 10, and obtains from the display identification number list a display identification number L10 corresponding to $9 \leq X \leq 10$.

When the display identification numbers for the respective signal values are obtained in this way, information about them is output to the drawing unit 14.

The drawing unit 14 obtains, from the drawing data file stored in the second storage unit 13, drawing data corresponding to the display identification numbers received from the display-format determination unit 12, creates image display data representing the signal lines based on the obtained drawing data, and causes the display device 2 to display the image display data.

Figure 9:
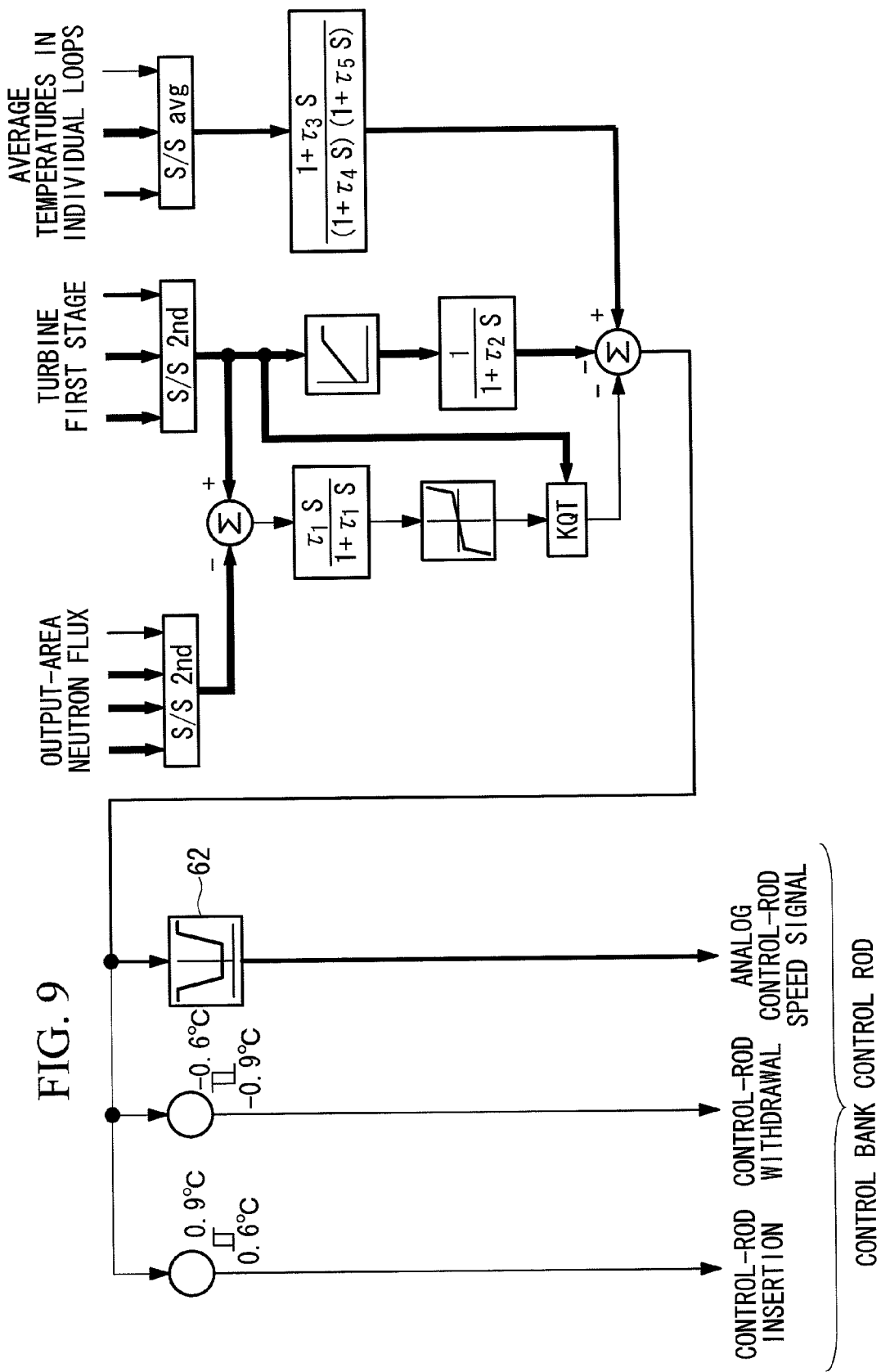
FIG. 9 is a diagram showing an example display screen displayed on a display device.

Thus, for example, as shown in FIG. 9, a control logic diagram in which the signal values transferred via the signal lines are reflected in the thicknesses of the signal lines is displayed on the display device 2.

Then, the above-described processing is repeated, thereby reflecting the signal values, currently calculated by the control device 4, in the thicknesses of the signal lines and displaying the changes of the signal values as animation.

As described above, according to the display system and the display method of this embodiment, since the control logic diagram for the control process of the control rods is displayed on the display device 2, and the display formats of the signal lines shown in the control block diagram are changed according to the signal values transferred via the signal lines, a plant observer who checks this display can easily understand not only the state of the controlled objects but also details of the control performed in the control device, which controls the controlled objects.

Note that, in the above-described embodiment, the thickness of each signal line is changed according to the signal value; however, the display format is not limited thereto. For example, in order to clearly present a change in temperature, the color of the signal line may be changed from a cold color, such as blue, to a warm color, such as red, as the temperature becomes higher. Furthermore, the line type may also be changed.

Modification 1

Figure 10:
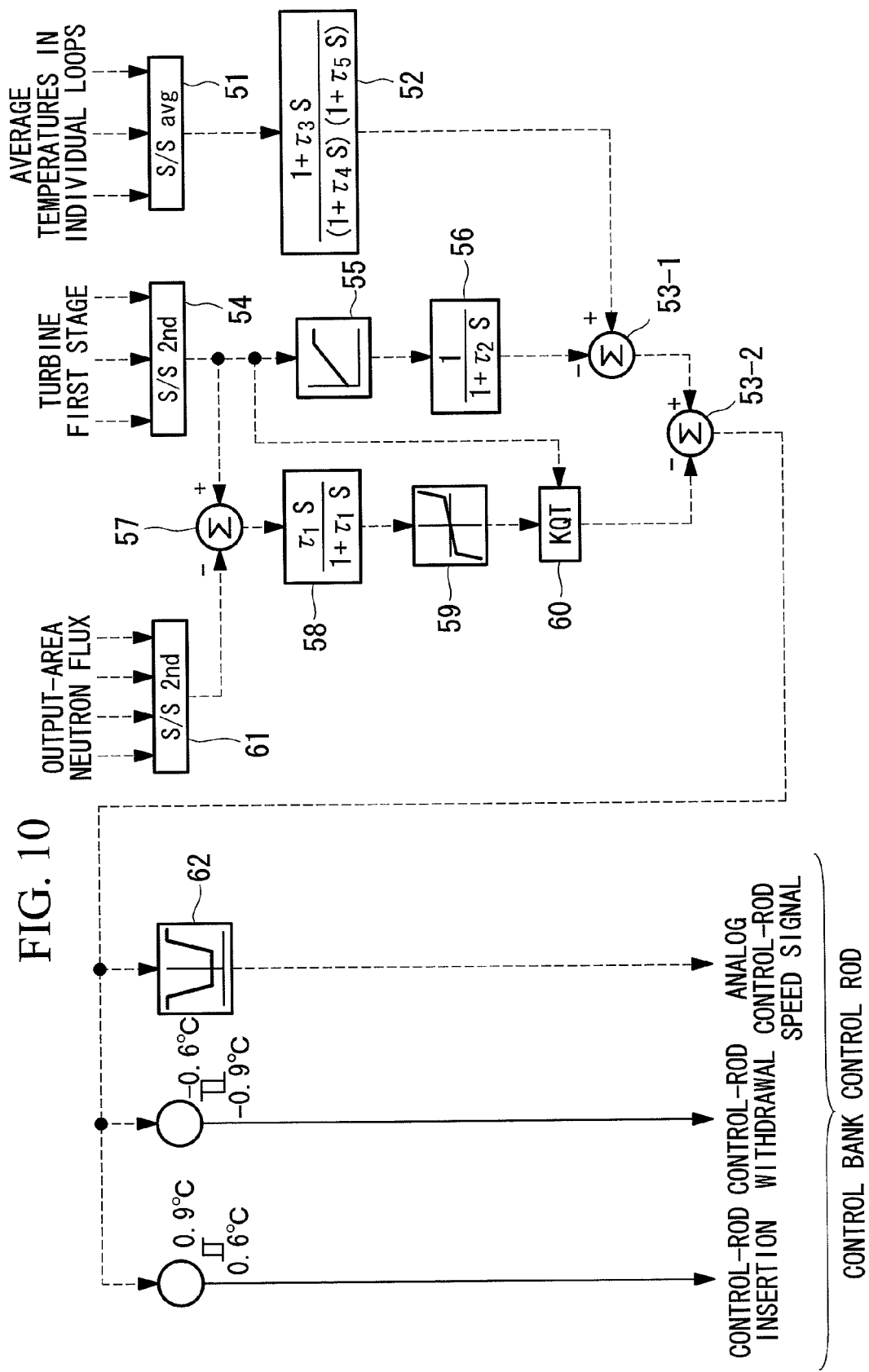
FIG. 10 is a diagram showing another example display of the control logic diagram.

Note that, as a modification of this embodiment, when the control logic diagram is displayed on the display device 2, the configuration of the control logic itself may be modified in a clearer way and displayed on the display device 2. For example, in FIG. 1, three input signal values are input to the second subtractor 53; however, as shown in FIG. 10, the second subtractor 53 may be divided and displayed as two subtractors 53-1 and 53-2. In this way, if a single control component is divided and displayed as two or more control components in terms of its function, the state or the behavior of the control can be more clearly presented to the observer.

Modification 2

Furthermore, if a control value has an attribute, such as plus or minus, the display format may be changed according to the attribute. For example, in the above-described control-rod control, there are directions in which the control rods are inserted and withdrawn. Therefore, in such a case, the display format of a signal line, such as the color, may be switched depending on whether the control rods are being inserted or withdrawn.

In a specific detail of the control performed in this case, the control device 4 further adds, as an attribute, a control-rod control direction to the variable name GDA023 corresponding to the control level for the control rods and outputs them to the display control device 3. When the display-format determination unit 12 of the display control device 3 obtains the signal value and the attribute of the variable name GDA023, it reads thresholds for GDA023 from the display criterion list, compares the signal value with each of the thresholds, and obtains the display identification number corresponding to the comparison result from the display identification number list shown in FIG. 8. Then, the display-format determination unit 12 associates the display identification number and the attribute with the variable name GDA023 and outputs them to the drawing unit 14.

The drawing unit 14 obtains from the drawing data file of the second storage unit 13 the drawing data for the signal line, corresponding to the display identification number, obtains color information for the signal line from the attribute, and changes the display format of the signal line of the variable name GDA023 in the control logic diagram displayed on the display device 2, based on this information. Thus, for example, the color of the signal line is changed depending on whether control-rod withdrawal control or control-rod insertion control is performed. Therefore, the current control-rod control state can be clearly presented to the observer.

Modification 3

In this embodiment, the thickness of a signal line has been mainly described. When a signal value exceeds a predetermined range of warning values or abnormality determining values, for example, a display format other than line thickness may be used. For example, the color may be changed or the signal line may be blinked. When the display format other than the thickness is used in this way, it is possible to emphasize a particular part more than the other parts and to immediately notify the observer of an abnormality.

Modification 4

Furthermore, in this embodiment, a description has been given of the case where the display format of the control logic is changed by using one display criterion list; however, for example, this display criterion list may be changed according to the state of the plant. For example, display criterion lists may be provided for respective output states of the plant, such as a rated-output state, a halted state, and a temperature adjustment output state, and switched according to the current output state. Thus, a feature to be highlighted can be presented in an emphasized manner depending on the respective plant states.

Modification 5

In this embodiment, a description has been given of a configuration in which the first storage unit 11, the display-format determination unit 12, the second storage unit 13, and the drawing unit 14 are included in the display control device 3; however, these components are not necessarily integrated. For example, a configuration in which the display-format determination unit 12 and the drawing unit 14 are separately provided and information is exchanged therebetween via a communication medium may be used. In this way, the arrangement of the components of the display control device 3 is not particularly limited. Furthermore, the control device 4 and the display control device 3 may be integrated.

Modification 6

In this embodiment, a description has been given of the case where the display of the control logic and the display format thereof are changed in the monitoring display system, which actually monitors the operational state of the plant; however, the display system 1 of this embodiment can also be applied to, for example, a training tool used for training an observer. For example, in the plant, since appropriate and prompt action by an observer is required when an abnormality is detected in the plant, simulation training to prepare for the occurrence of possible abnormalities is regularly performed in order to improve the skill of the observer. Therefore, when the above-described display system of this embodiment is applied to this type of simulation training apparatus, it is possible to further deepen the understanding of the observer and to make efficient use of the display system to allow the observer to figure out the cause of the occurrence of an abnormality. To apply the display system of this embodiment to this simulation training apparatus, the same processing as that described above just needs to be performed based on signal values output from the control device 4 provided in the simulation training apparatus.

Application Example

Furthermore, the display system and the display method of the present invention are generally a system and a method that clearly visualize and present to a user, when there are a controlled object and a control device for controlling the controlled object, the calculation process performed in the control device and the amount of operation to be eventually given to the controlled object as a result of the calculation process. The controlled object and control details are not particularly limited to a device in the plant. The display system and the display method of the present invention can be applied to various fields, such as, a field in which a control device for an automobile engine is visualized and presented.

REFERENCE SIGNS LIST

1 display system
2 display device
3 display control device
4 control device
11 first storage unit
12 display-format determination unit
13 second storage unit
14 drawing unit
21 CPU
22 main storage
23 auxiliary storage
24 communication I/F
51 average-value calculation circuit
52 leading/lagging compensation circuit
53 second subtractor
54 first signal-selection circuit
55 signal conversion circuit
56 primary delay circuit
57 first subtractor
58 incomplete differentiation circuit
59 nonlinear gain circuit
60 variable gain circuit
61 second signal-selection circuit
62 control-rod speed-determining circuit

The invention claimed is:

1. A display system comprising:
a display device; and
a control device that controls a controlled object, the control device performing a calculation process to calculate a signal value transferred to or from a control component via a signal line during a control process;
a display control device that presents the calculation process performed by the control device that controls the controlled object, that displays, on the display device, a control block diagram including the control component and the signal line and a state of the controlled object, and that changes a display format of the signal line in the displayed control block diagram according to the calculated signal value transferred via the signal line during the control process,
wherein the display control device sets one or more thresholds by dividing a range within which the signal value transferred via the signal line in the control block can fall and determines the display format of the signal line from the relationship between the thresholds and the signal value, and
wherein, when the control component obtains one output signal value from two or more input signal values, the display control device uses a common threshold to determine the display format for each of the input signal values.

2. A display system according to claim 1, wherein the display control device changes the thickness or color of the signal line according to the signal value transferred via the signal line in the control block diagram.

3. A display system according to claim 1, wherein, when an input signal value input to the control component and an output signal value output from the control component are substantially the same, as in phase compensation, the display control device displays the signal line of the input signal value and the signal line of the output signal value with the same display format.

4. A display system according claim 1, wherein, when an input signal value input to the control component and an output signal value output from the control component indicate the same property while the control level remains substantially unchanged, as in proportional control, integral control, derivative control, or a combination involving these, the display control device displays the signal line of the input signal value and the signal line of the output signal value with the same display format.

5. A display system according to claim 1, wherein, when a lower limit and/or an upper limit used to determine an abnormality or a warning is set for the signal value, the display control device changes the display format of the signal line based on the lower limit and/or the upper limit.

6. A display system according to claim 1, wherein, when an integrated control component that obtains one output signal value from three or more input signal values is included in the control block diagram, the control block diagram is displayed on the display device such that the integrated control component is divided into a plurality of divided control components each of which obtains one output signal value from two input signal values.

7. A display system according to claim 1,
wherein the controlled object is an apparatus that constitutes part of a plant, such as a nuclear power plant or a thermal power plant; and
the display control device has a display criterion list used to determine the display format of the signal line, for each operational state of the plant, and changes the display format of the signal line by using the display criterion list according to the operational state of the plant.

8. A plant-operation monitoring system comprising a display system according to claim 1.

9. A display method comprising the steps of:
performing a calculation process with a control device for controlling a controlled object, the calculation process calculating a signal value transferred to or from a control component via a signal line during a control process;
displaying, on a display device, a control block diagram including the control component and the signal line and a state of the controlled object; and
changing, with a display control device, a display format of the signal line in the displayed control block diagram according to the calculated signal value transferred via the signal line during the control process;
the display control device setting one or more thresholds by dividing a range within which the signal value transferred via the signal line in the control block can fall and determining the display format of the signal line from the relationship between the thresholds and the signal value; and
the display control device using a common threshold to determine the display format for each of the input signal values when the control component obtains one output signal value from two or more input signal values.

* * * * *